(12) United States Patent
Cline et al.

(10) Patent No.: US 7,473,355 B2
(45) Date of Patent: Jan. 6, 2009

(54) CHEMICAL ADDITIVE CARRIER FOR FILTER

(75) Inventors: L. Steven Cline, Fayetteville, NC (US); Jeremy J. Ramsey, Erwin, NC (US)

(73) Assignee: Purolator Filters NA LLC, Fayetteville, NC (US)

(*) Notice: Subject to any disclaimer, the term of this patent is extended or adjusted under 35 U.S.C. 154(b) by 257 days.

(21) Appl. No.: 11/273,741

(22) Filed: Nov. 15, 2005

(65) Prior Publication Data

US 2007/0108115 A1 May 17, 2007

(51) Int. Cl.
*B01D 35/00* (2006.01)
*C02F 1/00* (2006.01)

(52) U.S. Cl. ............... 210/206; 210/198.1; 210/199; 210/256; 210/416.4; 210/416.5; 210/493.1

(58) Field of Classification Search ........... 210/166, 210/167.11, 167.4, 167.3, 198.3, 206, 256, 210/416.4, 416.5, 416.6, 493.1, 321.77, 451, 210/190, 457
See application file for complete search history.

(56) References Cited

U.S. PATENT DOCUMENTS

| | | | |
|---|---|---|---|
| 4,265,748 A | | 5/1981 | Villani et al. |
| 4,683,057 A | * | 7/1987 | Krause et al. ............... 210/232 |
| 5,803,024 A | | 9/1998 | Brown |
| 2003/0111398 A1 | * | 6/2003 | Eilers et al. ................. 210/209 |
| 2005/0040092 A1 | | 2/2005 | Eilers et al. |
| 2005/0126210 A1 | * | 6/2005 | Knecht et al. ................. 62/474 |

FOREIGN PATENT DOCUMENTS

WO 2004/020070 A1 3/2004

OTHER PUBLICATIONS

Corresponding European Search Report dated Mar. 16, 2007.
Corresponding European office action dated Jun. 9, 2008.

* cited by examiner

*Primary Examiner*—Matthew O. Savage
*Assistant Examiner*—Lucas Stelling
(74) *Attorney, Agent, or Firm*—Crowell & Moring LLP

(57) ABSTRACT

A delivery device for a chemical additive is provided for an oil filter. A carrier supporting a chemical additive is arranged within a central opening of a pleated filter media. The carrier interlocks with a center tube, also arranged within the central opening, that supports that filter media. The carrier includes fingers that axially and radially locate the carrier to prevent movement of the carrier within the filter.

5 Claims, 2 Drawing Sheets

CHEMICAL ADDITIVE CARRIER FOR FILTER

BACKGROUND OF THE INVENTION

This invention relates to fluid filters such as oil filters, and more particularly, the invention relates to a carrier for a chemical additive suitable for oil filters.

Use of chemical additives in oil filters has increased in the automotive industry. Chemical additives have typically been arranged within an oil filter and dispersed over the useful life of the oil filter to chemically treat the oil to provide desired properties.

One challenge with chemical additive devices has been the placement of the chemical additive within the oil filter. A device must be arranged within the oil filter in such a manner so as to facilitate easy assembly. Moreover, it is desirable to make the presence of the device transparent to the user. That is, the device must be arranged such that it does not rattle within the oil filter giving an uninformed user the impression that the oil filter is defective. A loose device also could lead to a breakage or undesired operation within the oil filter.

What is needed is device for delivering a chemical additive that is easy to assemble within an oil filter, and that does not fit loosely.

SUMMARY OF THE INVENTION

The invention relates to a device for delivering a chemical additive in an oil filter. The oil filter includes a housing with a filter element arranged within the housing. The filter element includes a filter media that provides a central opening. Typically the filter media is a pleated paper element. A center tube is arranged within the central opening between end caps. A carrier that supports a chemical additive is arranged within the center tube.

The carrier includes one or more fingers that interlock with a feature on the center tube to axially and radially locate the carrier relative to the center tube, thereby preventing movement of the carrier within the oil filter.

The carrier includes spaced apart cylindrical walls that are joined to one another by axial walls. A floor is supported by the axial walls and is arranged on a side that is near an outlet of the oil filter. The carrier also includes ribs that locate the carrier relative to the center tube in a desired position. The carrier, along with the chemical additive, is inserted into the filter element during assembly of the filter element, which can then be installed into the housing as an assembly.

These and other features of the present invention can be best understood from the following specification and drawings, the following of which is a brief description.

DETAILED DESCRIPTION OF THE PREFERRED EMBODIMENT

Figure 1:
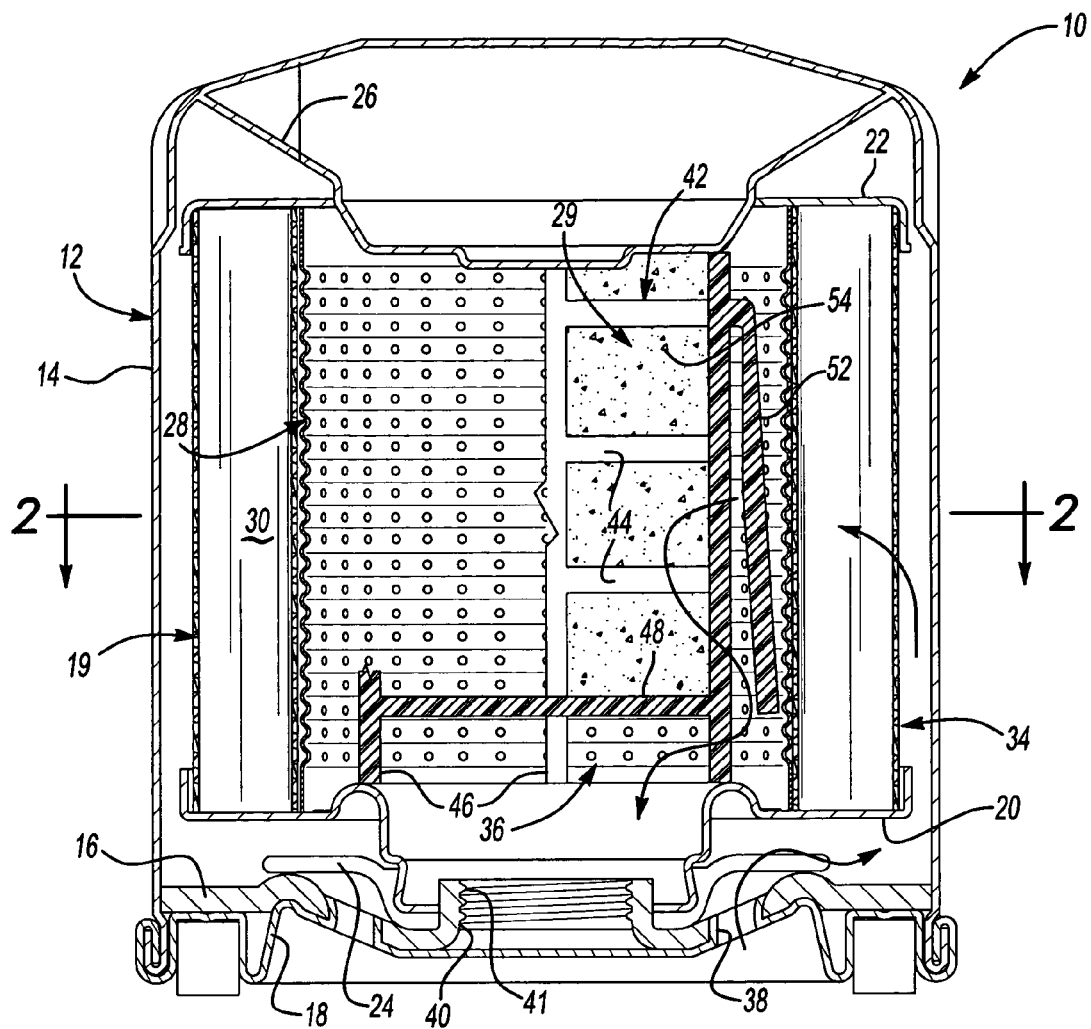
FIG. 1 is a cross-sectional view of a filter with the inventive carrier.

FIG. 1 illustrates a filter 10 in cross-section. The filter 10 includes a housing 12 having a can 14 providing an open end. A tapping plate 16 and retainer 18 are secured to the can 14 at the open end, as is known in the art. A filter element 19 is arranged within the housing 12 to filter fluid flowing through the filter 10. The filter element 19 includes first and second end caps 20 and 22. An anti-drain back valve 24 is arranged between the first end cap 20 and the tapping plate 16 as is typical for oil filter applications. A guide 26 is arranged between the second end cap 22 and the can 14 to locate the filter element 19 within the housing 12.

Figure 2:
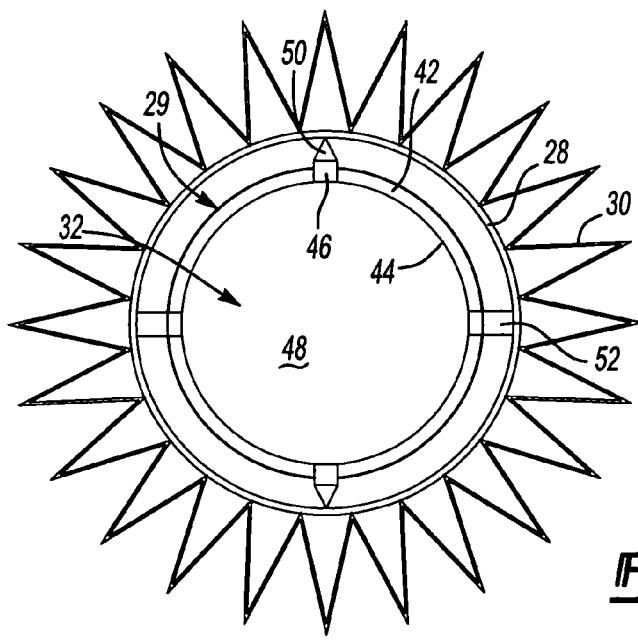
FIG. 2 is a top elevational view of the filter shown in FIG. 1 taken along line 2-2.

A filter media 30, such as a pleated paper, is arranged between the first and second end caps 20 and 22, as shown in FIGS. 1 and 2. The filter media 30 provides a central opening 32. The central opening 32 is typically provided on an outlet side 36 of the filter media 30. An inlet side 34 is typically provided at the outer circumference of the filter media 30. The tapping plate 16 typically includes numerous holes 38 spaced circumferentially about an outlet 40 to provide an inlet. The outlet 40 is typically provided by a threaded central aperture 41, which is used to secure the filter 10 to an adaptor (not shown).

Figure 3:
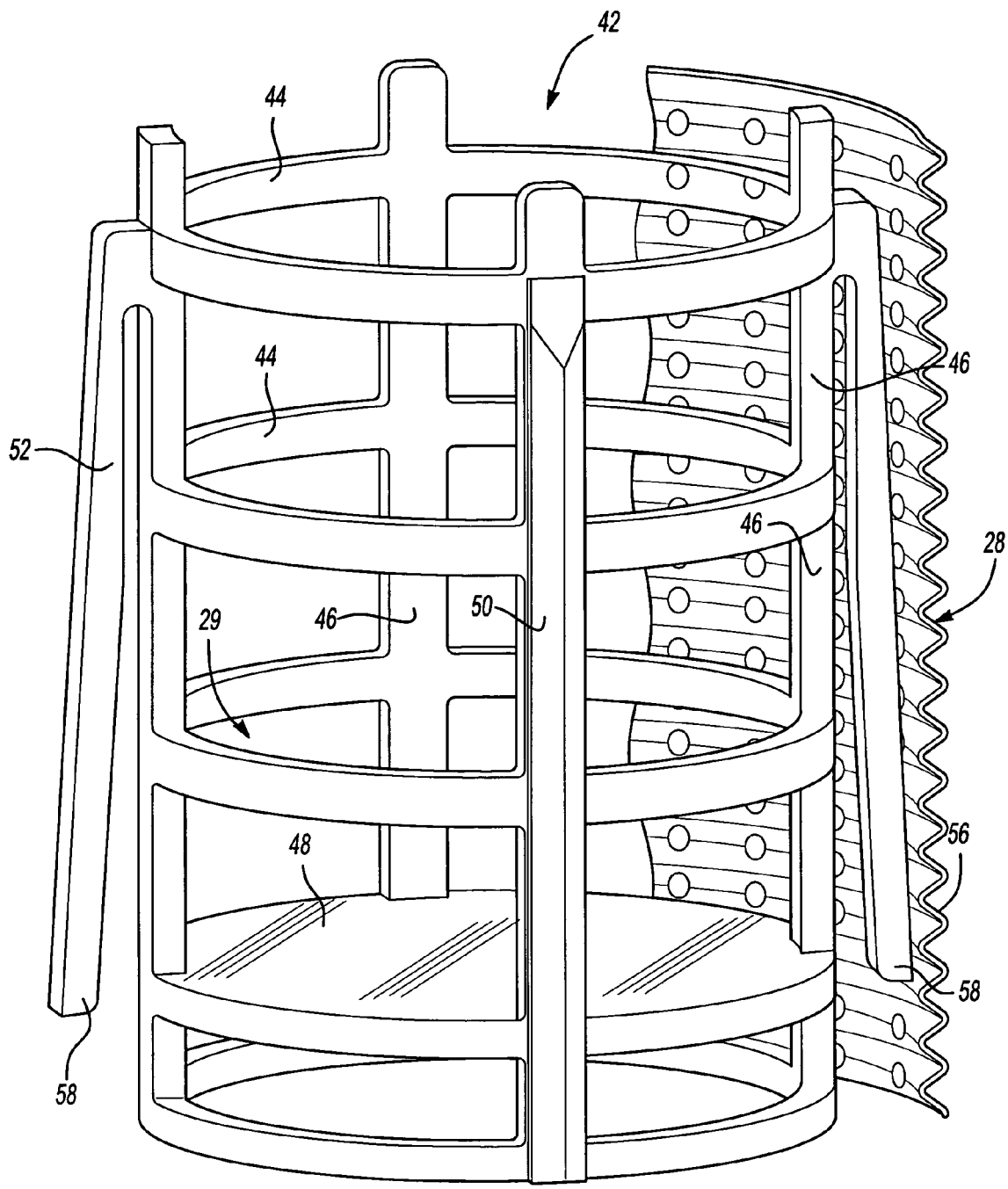
FIG. 3 is a partially broken perspective view of the inventive carrier shown interlocking with a feature of a center tube.

A center tube 28 is arranged within the central opening 32 to provide support for the filter media so that it does not collapse under the pressure of the fluid flowing through the filter element 19. Any number of different center tubes 28 may be used with the present invention. One such center tube 28 is shown in FIGS. 1-3, and includes multiple corrugations and perforations to permit fluid to flow through the center tube. Alternative center tubes may be spiral or helical center tubes or plastic center tubes.

An inventive chemical additive delivery device includes a carrier 42 that is arranged within the central opening 32 inside of the center tube 28. The example carrier 42 includes spaced apart circumferential walls 44 that are joined to one another by axial walls 46. The axial walls 46 also support a floor 48. The floor 48 supports the chemical additive 54. In the example shown, the floor 48 is arranged to one side of an intermediate portion of the carrier 42 so that it is near the outlet 40, as shown in FIGS. 1 and 3. This arrangement enables the floor 48 to support the chemical additive and prevent the chemical additive 54 from flowing out of the oil filter. The chemical additive 54 is only illustrated over a small area. In practice it would likely be distributed evenly over floor 48, and maybe in greater quantity than illustrated. The circumferential and axial walls 44 and 46 provide openings 29 that permit the flow of fluid from the center tube 28 into the carrier 42 where the chemical additive 54 may be dispersed.

The axial walls 46 may include ribs 50 that are used to locate the carrier 42 in a desired manner relative to the center tube 28. The ribs 50 extend away from the axial walls 46 toward the center tube 28. Fingers 52 also extend from the axial walls 46 outwardly away from the circumferential walls 44 to ends 58. In the example shown, the ends 58 are spaced from the circumferential walls 44 and are arranged near the floor 48. The ends 58 interlock with a feature 56 on the center tube to fix the carrier 42 relative to the center tube 28 and prevent the carrier 42 from moving within the filter 10 against other components. In the example shown in FIG. 3, which depicts a center tube 28 that is metal corrugated, the feature 56 is provided by the corrugations. In other embodiments, the feature 56 may be provided by any suitable portion of the center tube 28, or other components within the filter 10.

As appreciated from the above description and the Figures, the carrier 42 is part of the filter element 19. The carrier 42 is inserted within the central opening 32 provided by the filter media 30 during assembly of the filter element 19. The filter element 19 can be installed into the housing 12 during assembly of the filter 10 without modifying the presently used assembly process. If desired, the carrier 42 and center tube 28 may be preassembled prior to the insertion of the center tube 28 into the central opening 32.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A filter comprising:
   a housing;
   a filter media arranged within the housing and providing a central opening;
   a carrier arranged within the central opening and supporting a chemical additive; wherein a center tube is arranged within the central opening between the filter media and the carrier;
   wherein the carrier interlocks with the center tube axially locating the carrier and center tube relative to one another; and
   wherein the carrier includes a finger interlocking with a feature on the center tube.

2. The filter according to claim 1, wherein the filter media is pleated paper forming a generally cylindrically shaped member.

3. The filter according to claim 1, wherein the carrier includes an intermediate portion and a floor on one side of the intermediate portion near an outlet of the housing, the floor supporting the chemical additive.

4. The filter according to claim 3, wherein the filter media includes an inlet side and an outlet side, the central opening arranged on the outlet side, the filter media separating an inlet in the housing from the outlet.

5. The filter according to claim 3, wherein the carrier includes a rib adjacent to the center tube radially locating the carrier relative to the center tube.

* * * * *